(12) United States Patent
Tufashiey

(10) Patent No.: US 12,049,752 B2
(45) Date of Patent: Jul. 30, 2024

(54) ADAPTIVE BUILDING ENVELOPES

(71) Applicant: Hanan Tufashiey, Greenfield, IN (US)

(72) Inventor: Hanan Tufashiey, Greenfield, IN (US)

(*) Notice: Subject to any disclaimer, the term of this patent is extended or adjusted under 35 U.S.C. 154(b) by 209 days.

(21) Appl. No.: 17/743,746

(22) Filed: May 13, 2022

(65) Prior Publication Data

US 2022/0364352 A1 Nov. 17, 2022

Related U.S. Application Data

(60) Provisional application No. 63/187,963, filed on May 13, 2021.

(51) Int. Cl.
| | |
|---|---|
| *E04B 1/34* | (2006.01) |
| *A01G 31/00* | (2018.01) |
| *B01D 29/01* | (2006.01) |
| *C02F 1/00* | (2023.01) |
| *C02F 103/00* | (2006.01) |
| *H02S 20/22* | (2014.01) |

(52) U.S. Cl.
CPC ........... *E04B 1/34* (2013.01); *B01D 29/01* (2013.01); *C02F 1/001* (2013.01); *A01G 31/00* (2013.01); *C02F 2103/001* (2013.01); *C02F 2201/009* (2013.01); *H02S 20/22* (2014.12)

(58) Field of Classification Search
CPC .... E04B 1/34; E04B 1/3404; E03B 2001/047; E03B 3/02; E03B 3/03; C02F 1/006; C02F 1/001; C02F 2103/06; C02F 2201/009; C02F 2103/001; B01D 29/01; H02S 20/22; A01G 31/00
See application file for complete search history.

(56) References Cited

U.S. PATENT DOCUMENTS

| | | | | |
|---|---|---|---|---|
| 3,870,605 | A * | 3/1975 | Sakamoto | E03B 3/03 202/83 |
| 6,436,283 | B1 * | 8/2002 | Duke | E03B 3/02 210/748.11 |
| 11,821,180 | B1 * | 11/2023 | Rahmouni | E03B 3/02 |
| 2012/0017996 | A1 * | 1/2012 | Wenger | E03B 3/03 137/1 |
| 2018/0073221 | A1 * | 3/2018 | Valinejadshoubi | E06B 9/32 |

FOREIGN PATENT DOCUMENTS

| | | | | |
|---|---|---|---|---|
| CN | 106669367 | | 3/2019 | |
| DE | 202004010594 U1 * | | 11/2004 | A01K 63/00 |
| KR | 102060940 B1 * | | 12/2019 | |
| KR | 20200103296 A * | | 9/2020 | |
| WO | WO-2011099042 A2 * | | 8/2011 | A45B 23/00 |
| WO | WO-2019195995 A1 * | | 10/2019 | |
| WO | 2020030236 | | 2/2020 | |
| WO | WO-2022052126 A1 * | | 3/2022 | |

* cited by examiner

*Primary Examiner* — Theodore V Adamos
(74) *Attorney, Agent, or Firm* — Woodard, Emhardt, Henry, Reeves & Wagner, LLP

(57) ABSTRACT

Adaptive buildings and building envelopes having a system of structural members which also function as one or more selectively independent fluidic transport systems. Fluids to be transported such as air, rainwater, potable water, irrigation water, and/or gray water, are moved about the adaptive buildings via the various fluidic transport systems to locations disposed about the adaptive buildings where they are used as needed. Such fluids are also selectively filtered and cleaned by a plurality of filter plate systems disposed about the structure.

20 Claims, 9 Drawing Sheets

ADAPTIVE BUILDING ENVELOPES

CROSS REFERENCE TO RELATED APPLICATIONS

This application is related to U.S. Provisional Patent Application No. 63/187,963 filed on May 13, 2021, titled "ADAPTIVE BUILDING ENVELOPE TO MITIGATE ANTHROPOGENIC AIR AND WATER POLLUTION", which is incorporated by reference herein.

FIELD

The claimed technology relates generally to building design and construction techniques and more particularly to buildings envelopes having water and air purification features.

BACKGROUND

Air and water pollution caused by human activities are among the most serious challenges facing humanity and the environment that serves the planet's organisms. Pollution has been shown to contribute to global warming and climate change, health issues that plague humans every day, and endangerment of plants and animal species. Modern building design, construction, and operation is, at best, neutral but more typically contributes to the worsening of these issues. Modern buildings contribute to the heat island effect, toxic compounds from construction materials may leech into the air. Rainwater is typically diverted untreated into storm sewers also collects toxic materials as it travels over and down modern buildings and/or through a building's water collection systems. Such construction also harms biological diversity by displacing most species and providing a suitable habitat for a limited variety of animals (primarily a narrow range of birds, rodents, and insects). There is a need for construction techniques and practices which lessen the negative impact of buildings on the natural environment and/or which may actually contribute positively to the removal of pollutants from the air and/or water (e.g., rain) in and around a building.

DESCRIPTION

Figure 1:
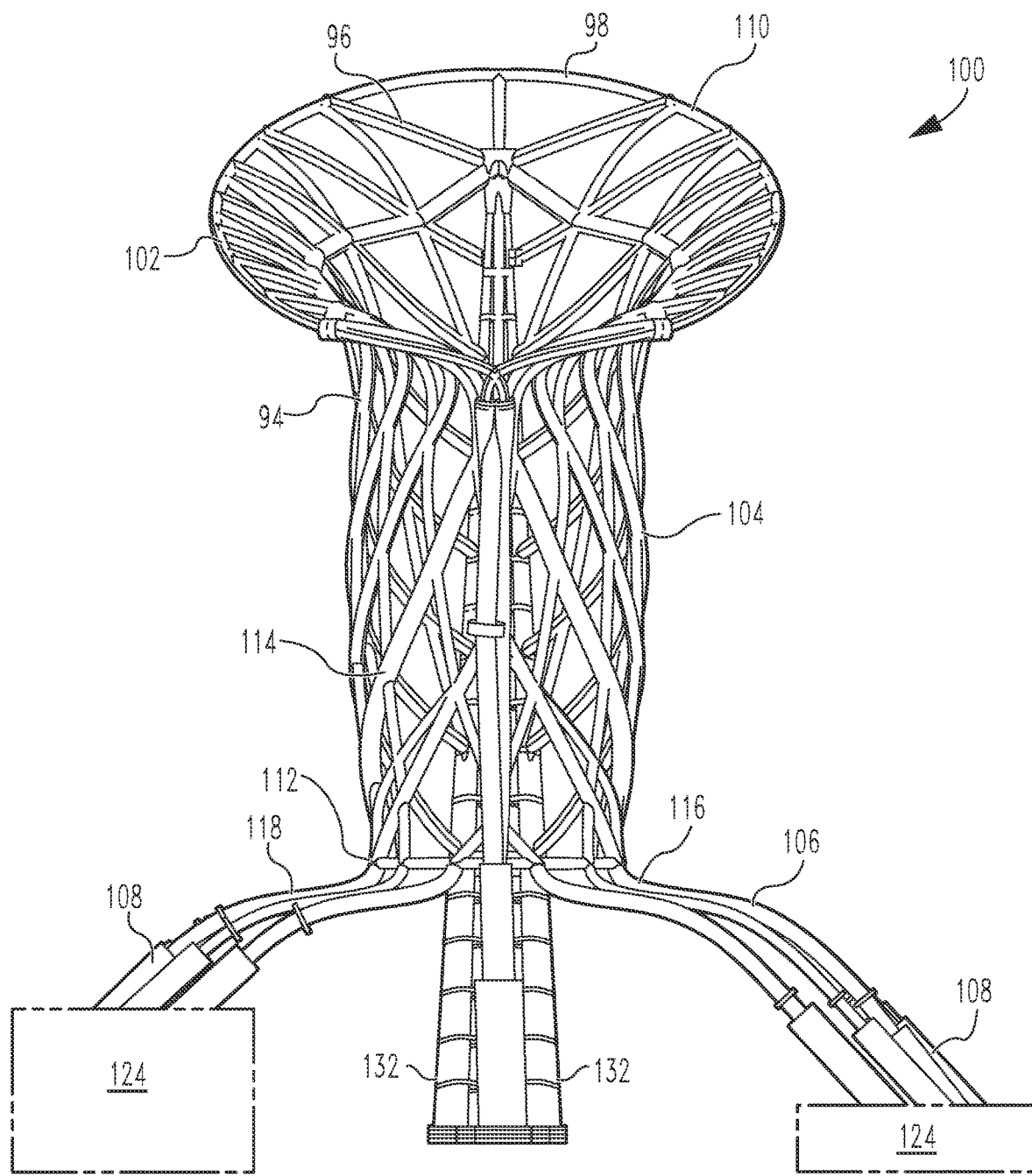
FIG. 1 is a front view of an adaptive building according to one embodiment.

For the purposes of promoting an understanding of the principles of the claimed technology and presenting its currently understood best mode of operation, reference will now be made to the embodiments illustrated in the drawings and specific language will be used to describe the same. It will nevertheless be understood that no limitation of the scope of the claimed technology is thereby intended, with such alterations and further modifications in the illustrated device and such further applications of the principles of the claimed technology as illustrated therein being contemplated as would normally occur to one skilled in the art to which the claimed technology relates.

Figure 2:
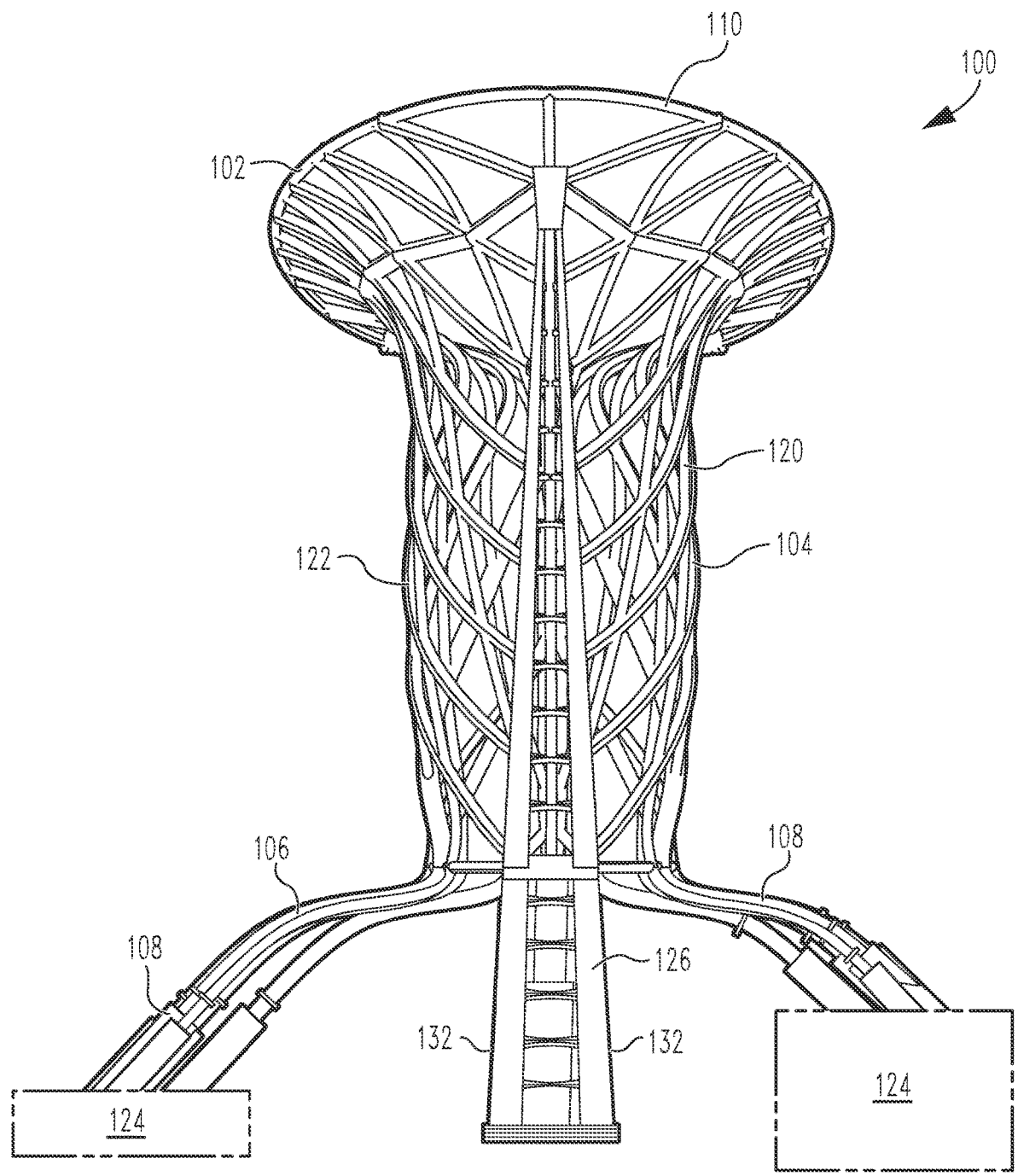
FIG. 2 is a rear view of the adaptive building shown in FIG. 1.
Figure 3:
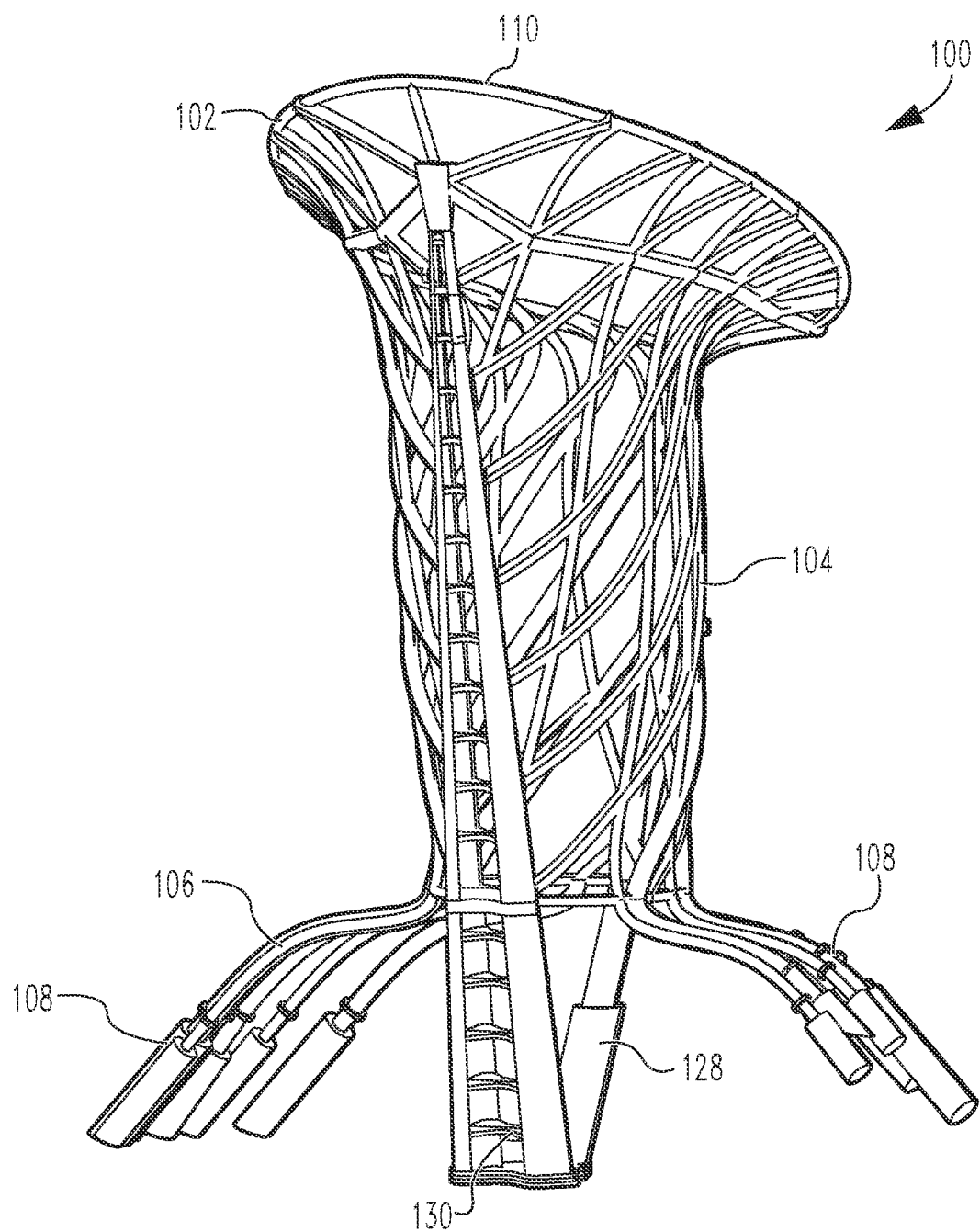
FIG. 3 is a rear perspective view of the adaptive building shown in FIG. 1.

FIGS. 1-3 show an adaptive building 100 according to one embodiment of the present disclosure. In this example, the adaptive building structure 100 has an upper portion 102 with generally inverted frustoconical shape, a middle portion 104 that is generally cylindrical, and a lower or base portion 106 having a series of structural supports 108. The upper portion includes an upper support ring 110. The middle portion 104 and base portion 106 are separated by a lower support ring. 112. The adaptive building structure 100 in this example is made from using a plurality of hollow structural members 114. This plurality of hollow structural members 114 provide both structural support to the adaptive structure 100 as well as providing a network for transporting fluids (including air, water, and other fluid materials) throughout the adaptive structure 100. Optionally, all or portions of the upper support ring 110 and/or lower support ring 113 may be used to anchor a water impermeable sheet ring 98 such that rainwater falling on the sheet 98 is directed towards intake pipes 96 which are fluidically connected to one of more of the hollow structural members 114. Together water impermeable sheet(s) 98 and intake pipe(s) 96 form a rainwater collection system. Such an arrangement allows for rainwater to be collected and directed into the systems of the adaptive building 100 for immediate use or to be stored and used later. The water impermeable sheet 98 could be made from a fabric, metal, plastic, or other suitable material and may be translucent, transparent, or opaque as desired. Optionally, the water impermeable sheet 98 could be one or more solar panels which would allow the system to both collect rainwater and generate electricity. In other examples, one or more turbines 94 are disposed within the hollow structural members 114 so as to convert potential energy of fluid flowing general downward through the system into electrical energy.

In some examples, two or more distinctive fluid transport networks 116, 118 may be formed within a single adaptive building structure. For example, there might be a first series of hollow structural members 116 which transport air and a second series of hollow structural members 118 which transport fresh water (e.g., filtered rainwater). In such an example, the first series of hollow structural members 116 would only be in fluidic communication with each other but fluidically isolated from the second series of hollow structural members 118 which were likewise only in fluidic communication with each other. The first and second series of hollow structural members would be structurally related, however. That is, even thought there was no fluidic communication between the two series of hollow structural members they would be mechanically or otherwise structurally integrated to provide support to the overall adaptive building structure. Such mechanical or structural integration might take the form of welds, brackets, and the like. In other examples, there may be one or more contact points where the first and second series of hollow structural members have potential fluidic communication between one another using one or more valves. In such examples, portions of one series of hollow structural members might be temporarily brought into fluidic communication with the other series of hollow structural members by operation of one or more valves, then fluidically isolated by closing said valves. Such an arrangement allows for flexibility in the size and configuration of each series of hollow structural members.

A number of different hollow structural members 114 may be fluidically connected to form fluidic circuits 120, 122 for transporting materials throughout an adaptive building structure 100 such as those disclosed herein. Such structures might include fluidic circuits 120, 122 for transporting one or more of air, potable water, irrigation water (which might include fertilizers and the like), rainwater, gray water, or any other fluid as desired. As noted above, such systems may be completely separate fluidically or may be selectively fluidically isolated from one another using one or more valves to allow the systems to temporarily be in fluidic communication. Optionally, there may also be a series of hollow structural members 114 which act as mechanical chases for running cabling or piping carrying power lines, data lines, pneumatic lines, and the like. In some examples, such mechanical chases might be partially or entirely integrated with one of the other hollow structural member systems. For example, data lines might be run through a hollow structural member system designed to move air about the structure.

One or more of the hollow structural member systems 116, 118 may be connected to the support members 108 located in the lower or base portion 106 of the adaptive building 100. The exact nature and configuration of the support members 108 will vary according to the needs and circumstances of a particular adaptive building 100. Such factors might include the materials used to construct the building, the overall size of the particular building, the geographic location where the building is located (which might include wind, average rain/snowfall, tectonic activity, and the like), site-specific factors (water table, soil composition, bedrock, and the like), as well as any other relevant factors. In some examples, sufficient support might be provided by the hollow structural member systems directly. In other examples, the hollow structural member systems might need to be augmented using more traditional construction techniques (concrete piers/footings, and the like which portions of the hollow structural member systems might pass through and/or be integrated into). In still other examples, the hollow structural member systems might only be used in the lower or base portion of the building to transport fluids and structural support might be provided entirely by alternative structures.

Some or all of the hollow structural member systems 116, 118 may be fluidically connected to exterior facilities 124 or systems located at or near the base portion of the adaptive building as desired. For example, a hollow structural member systems 116, 118 adapted and configured to draw water into the adaptive building 100 might be operationally connected to one or more pumps which are pumping water from an outside source such as a river, lake, aquifer, or the like. For example, the outside facility 124 might be a rainwater storage tank/system which collects and store rainwater for later use by the systems. The exact nature of the outside facility 124 or system will vary according to the particular hollow structural member system, but might include air blowers/filters/prefilter systems, municipal water systems (either to draw water from the system or to return cleaned water from the adaptive building to the system), irrigation systems, surface or groundwater features (either to draw water from them or to return cleaned water to them from the adaptive building).

The adaptive building 100 shown in FIGS. 1-3 further includes a ladder-like support structure 126 having a series of cross members 130 connecting two vertical members 132. The support structure provides 126 structural support to the adaptive building 100 but also may act as a mechanical chase as well as a transport system from the base of the adaptive building to the middle and upper portions of the adaptive building. The support structure 126 might include one or more of mechanical chases, elevator(s), and pipes/pumps for moving fluids directly from the base of the adaptive building to the upper portions and/or otherwise moving fluids around the system.

The adaptive building shown in FIGS. 1-3 may also further includes a columnar support structure 128 disposed opposite the ladder-like support structure 126. The columnar support structure 128 provides support to the adaptive building 100 as well as service as a location and structure to serve as a mechanical chase as well as a fluid transport system from the base 106 of the adaptive building 100 (optionally) to the middle 104 and upper 102 portions of the adaptive building 100. The columnar support structure 128 might include one or more of mechanical chases, elevator(s), and pipes/pumps for moving fluids directly from the base of the adaptive building 100 to the upper portions. In other examples, the columnar support structure 128 and/or ladder like support structure 126 may not be required. For example, if the systems and techniques disclosed herein are adapted to an existing building then the function of the columnar support structure and/or ladder like support structure (e.g., providing structural support, providing facilities for mechanical systems, etc.) may also be provided by the existing building.

Figure 4:
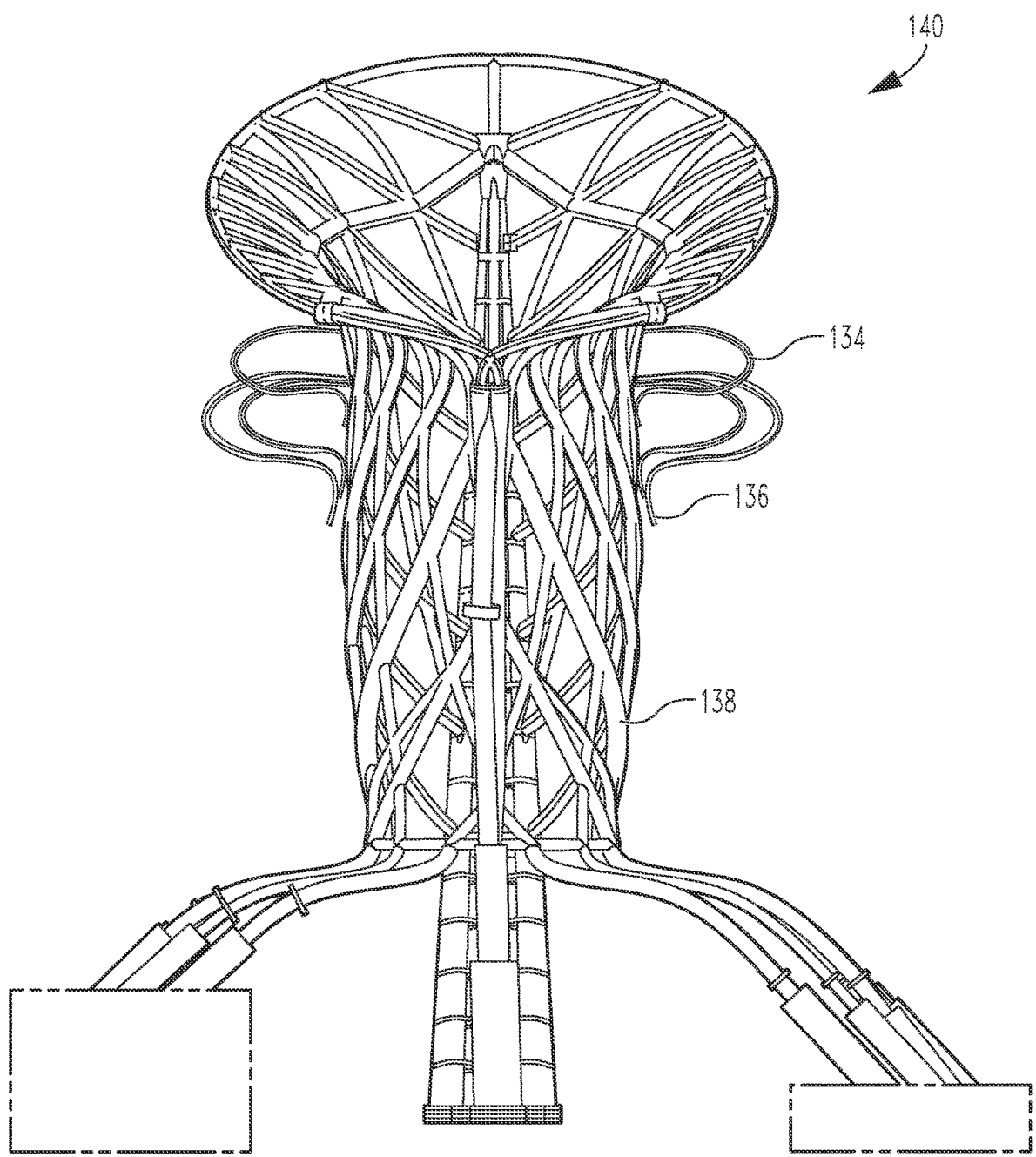
FIG. 4 is a rear view of the adaptive building according to another embodiment.
Figure 5:
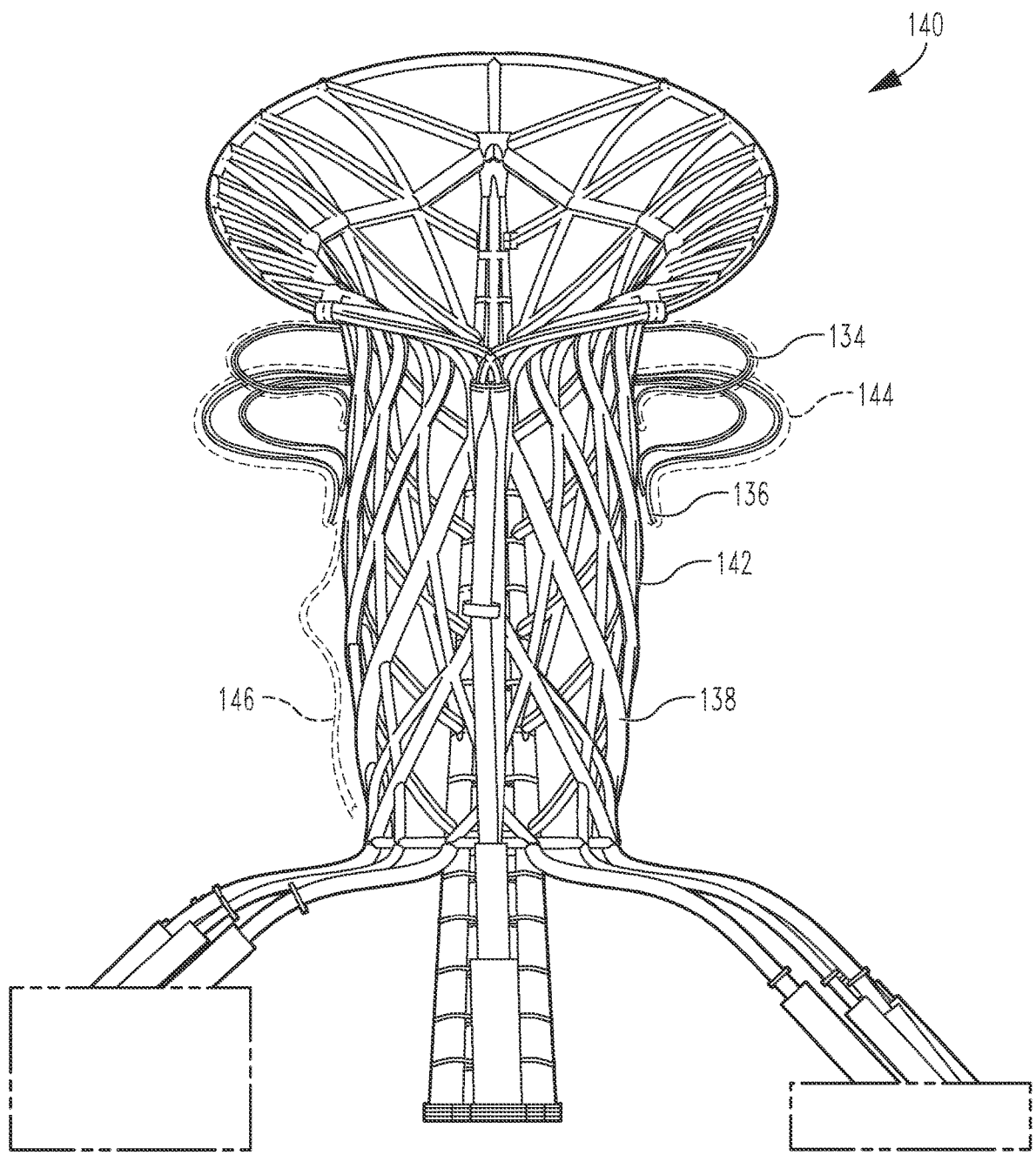
FIG. 5 is a rear view of the adaptive building shown in FIG. 4.
Figure 6:
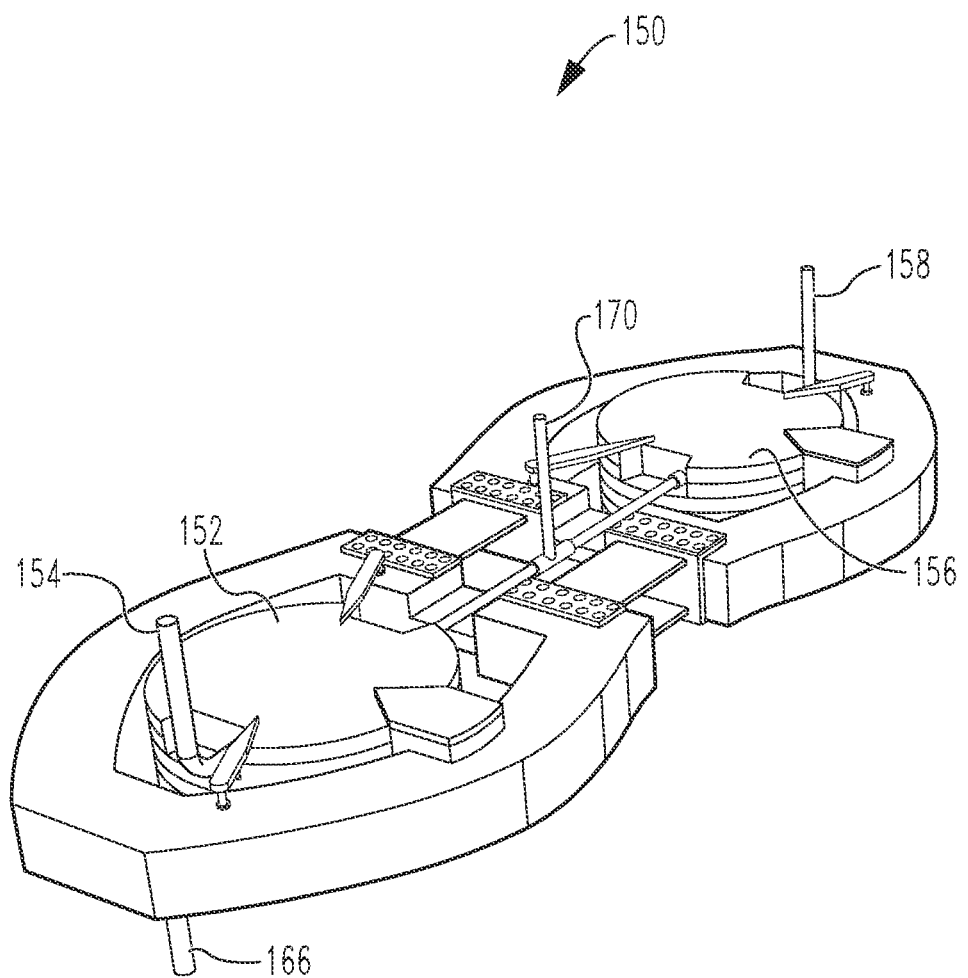
FIG. 6 is a perspective view of a filter plate assembly according to one embodiment.
Figure 7:
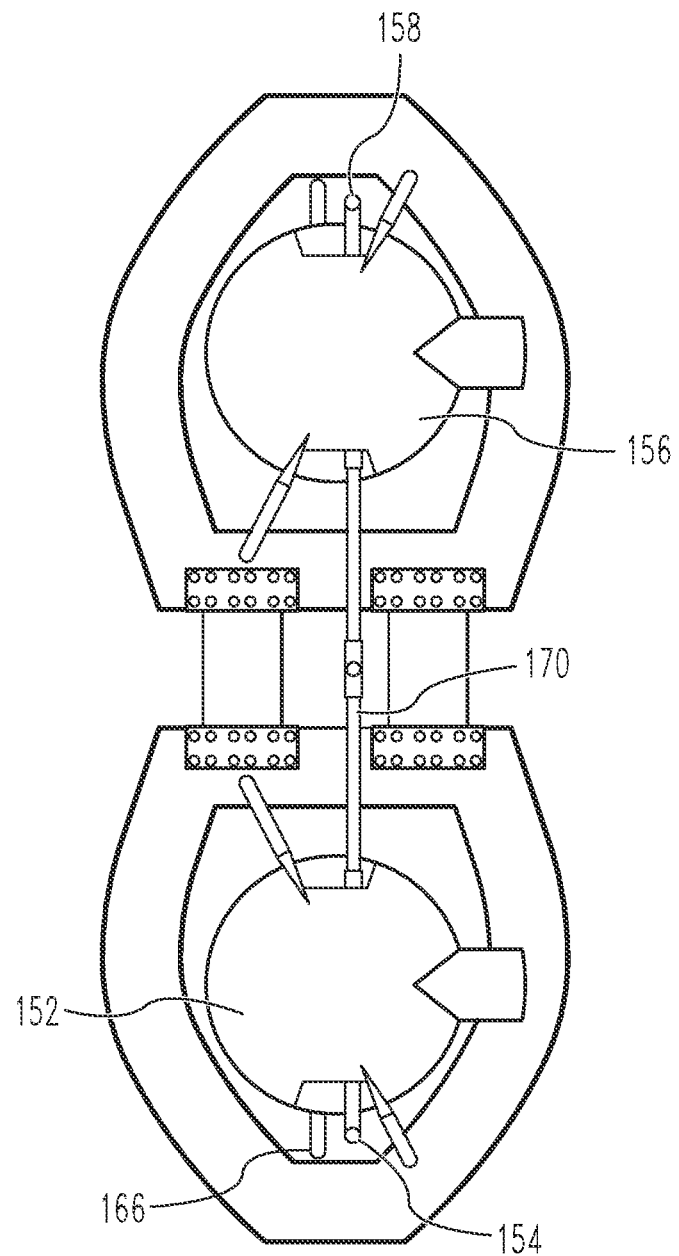
FIG. 7 is a top plan view of the filter plate assembly of FIG. 6.
Figure 8:
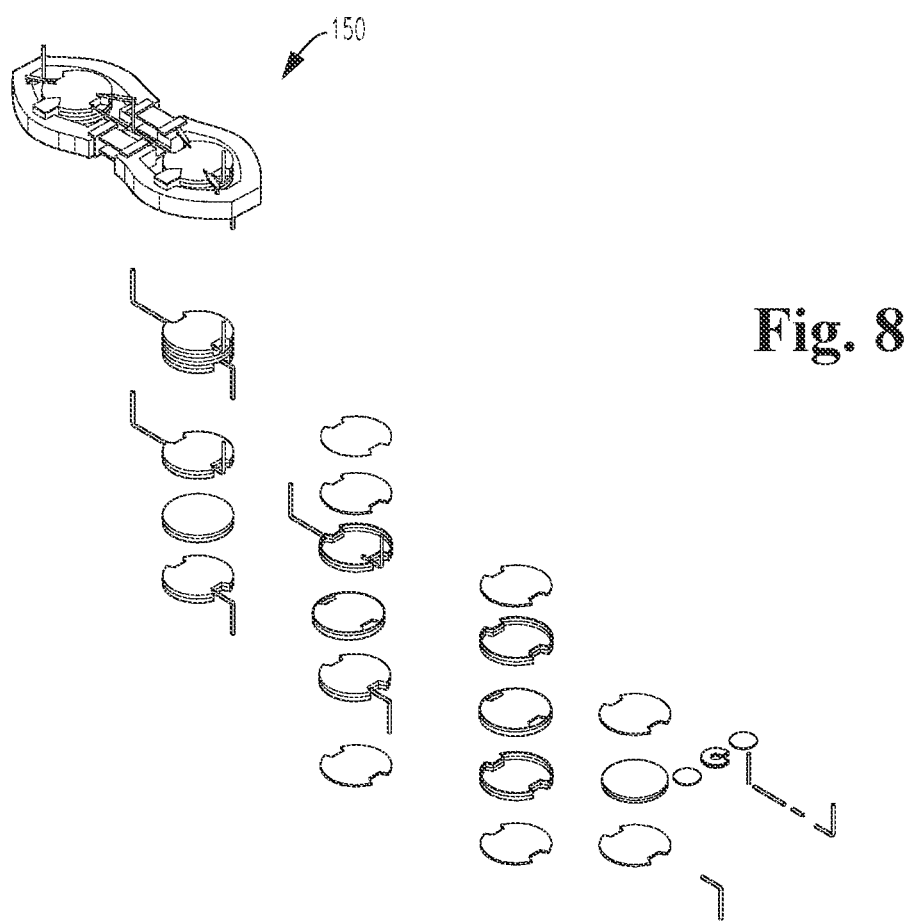
FIG. 8 is an exploded view of one half of the filter plate assembly of FIG. 6.
Figure 9:
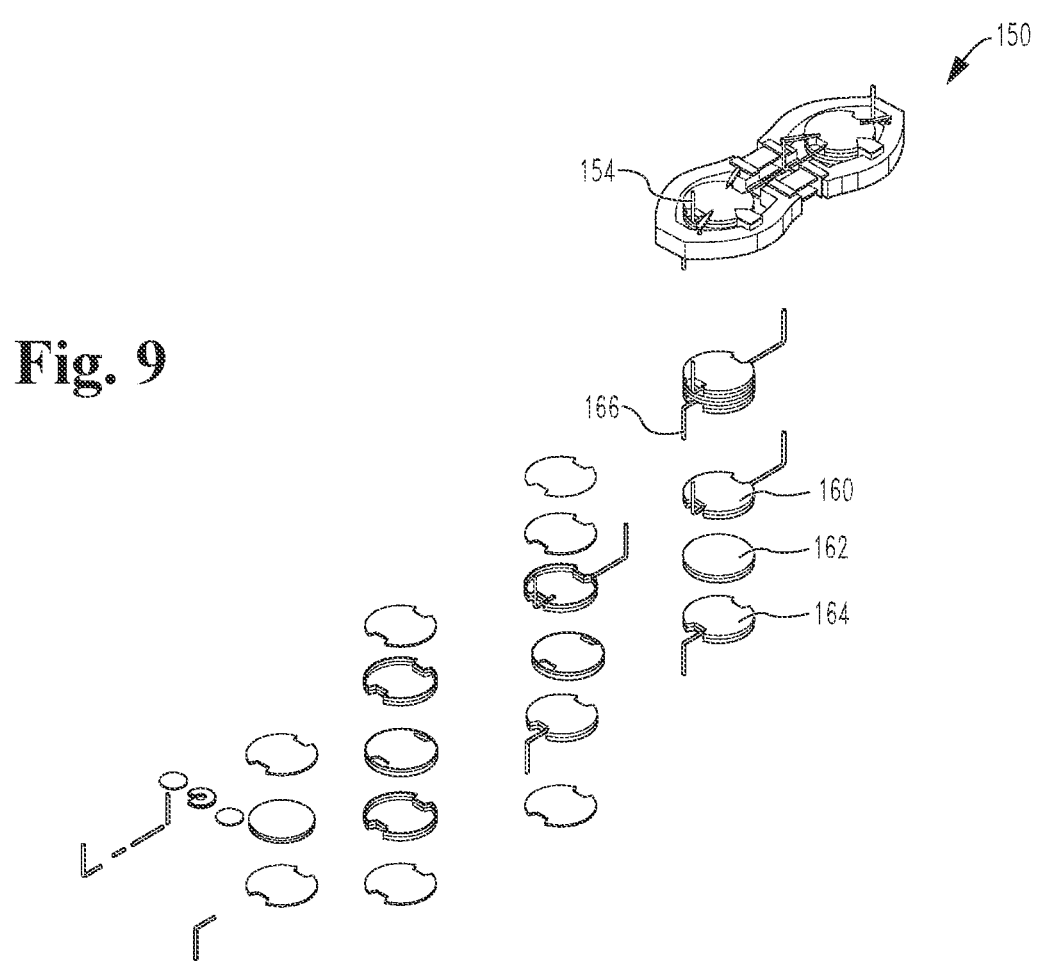
FIG. 9 is an exploded view of the other half of the filter plate assembly of FIG. 6.

As shown in FIGS. 4-5, adaptive building structures 140 according to the present disclosure may also include one or more lateral support structures 134. These lateral support structures 134 are structurally connected 136 to the middle portion 142 of the adaptive building structure 140 where desired by mechanical means (brackets, welds, and the like) to one or more of the pipes of one or more of the hollow structural member systems. Optionally, in addition to mechanically/structural connections 136 there may also be fluidic connection between a lateral support structure 134 and one or more of the pipes of one or more of the hollow structural member systems 138 so as to allow the movement of fluids between the two in either direction (i.e., from a hollow structural member systems 138 to the lateral support structure 134 or from the lateral support structure 134 to the hollow structural member systems 138). In other examples, an auxiliary fluid system which is mounted on/to the lateral support structure but not actually a part of the lateral support structure is in fluidic communication with one or more hollow structural member systems and is capable of bringing fluids to or taking fluids away from the lateral support structure.

The exact number, size, and configuration of a lateral support structure 134 may vary as desired and according to the purpose of the individual lateral support structure. Optionally, two or more lateral support structures may be positioned and/or mechanically/structurally linked so as to provide a larger and/or more stable platform. The lateral support structures 134 can be designed and configured for a variety of purposes. The lateral support structures 134 might support a conventional walkway/catwalk system 144 providing a recreational space for users. Such spaces might include walkways, planters, water features, and the like such that they resemble a small traditional park. In other examples, such lateral support structures might include facilities for growing crops or other plants including traditional planting beds, hydroponic growing structures, aeroponic structures, and the like. Such structures may be open to the air, canopies which screen a portion of direct sun, or within small, greenhouse style structures. The exact nature of the system(s) and enclosure used will vary according to where the adaptive building is located and/or the type of plants being grown. Such growing facilities may be used to grow decorative crops, cash crops, food crops, or any combination thereof. In still other examples, lateral support structures 134 may be used to support vertical or semi-vertical growth structures 146 for supporting and growing various plants, similar to so called vertical gardens. Such vertical structural feature snot only provide additional growing space but also can act to shield interior portions of the adaptive building from direct sun, wind, and precipitation. Optionally, lateral support structures 134 may also include structures for capturing/generating power such as wind turbines, photovoltaic solar cells, heat exchangers for heating water, and the like. In still other examples, lateral support structures might include two or more of the above-described features. For example, a lateral support structure 134 might have hydroponic equipment for growing plants which require partial sun which are shaded from direct sunlight by a plurality of solar panels.

Water, energy, and other requirements for the structures and uses deployed on a lateral support structure 134 may be provided directly from the hollow structural member systems 138 of the adaptive building 140. For example, water for a hydroponic system on a particular lateral support structure may be piped from one of the hollow structural member systems which is carrying water. This may be potable water, rainwater, gray water which is to be cleaned in other parts of the adaptive structure, or any combination thereof. Nutrients, fertilizers, and other compounds may be added automatically by a metered system which is fluidically connected between the lateral support structure and the hollow structural member system(s). Waste materials (used hydroponic water, rain runoff, and the like) and/or products (electricity from solar panels) may be removed from the facilities on a lateral support structure and added into the appropriate hollow structural member system.

Intersections and/or crossover junctions between two or more hollow structural member systems may also include a filter plate structure 150 and system such as is shown in FIGS. 6-9. For example, one or more of the lateral cross members of the ladder-like support structure might enclose a filter plate structure 150. In one example, a fluid (e.g., rain water) enters one side 152 of the filter plate structure 150 from a fluidically connected hollow structural member system 154 allocated for transporting that particular fluid. The other side of the filter plate 156 might be attached to a separate hollow structural member system 158 which is allocated to transport a separate fluid (e.g., groundwater). Optionally, both sides could be devoted to filtering the same fluid (e.g., rainwater).

The two sides function in a similar manner regardless of what fluid is being filtered so the present example will be continued by discussing the rainwater side of the system. The fluid (rainwater) is then drawn downward through a series of filter plates 160, 162, 164. In this particular example there are three layers of filter plates, but in other examples there may be more or fewer filter plates. The filter plates may be made from a variety of suitable materials (e.g., stone, metal, sand, activated carbon, polymer, and the like) and be structured so as achieve a desired flow rate through the plate material. Optionally, one or more the plates may be electrically charged so as to enhance their effectiveness. After passing through the series of filter plates 160, 162, 164 the now filtered fluid rejoins the hollow structural member system 166 from which it was drawn. The exact nature of the filter plates may vary according to which fluid is being filtered and what materials or compounds are to be removed. Examples of materials and compounds to be removed include particulate solids, dissolved gasses, volatile organic compounds (VOC's), heavy metals, sulfur compounds (SOx), oxides of carbon (CO and $CO_2$), as well as other materials or compounds. Spent filter plates may be removed for cleaning/recharging. Filtered materials may be collected for processing and eventual use within the adaptive building if they are useful (e.g., organic solids may be used as fertilizer). Optionally, the various layers of filers may be different from one another so as each is intended to better filter particular compound(s). For example, the upper most filter 160 (the first contacted by the rainwater in this example) might be configured to remove solid particles whereas the lower two filters 162, 164 are configured to remove heavy metals and VOCs.

In this particular example, air traveling upwards in a dedicated hollow structural member system 170 enters the filter plate structure from below and is directed such that some air enters the lower portion of the filter plate layers 152 which are filtering rainwater and some air enters a filtering plate system 156 for groundwater. The two side operate in a similar fashion so the present example will continue with a discussion of the rainwater side. The air directed into the rainwater filtering side aerates the rainwater thereby helping to promote the filtering/purification process. The upward air pressure also helps prevent the filtering plates from becoming clogged with solids as it provides a steady backpressure to the system to disrupt or prevent blockages. Passing air through the fluid being filtered (e.g., rainwater) also helps humidify the air as well as remove undesirable materials from the air (e.g., particulates, VOCs, and the like) so that those materials can then be removed from the fluid being filtered and captured on one of the filter layers. After the air reaches the top of the filtering assembly it is piped back to the hollow structural member system dedicated to carrying air.

The number, location, and configuration of such filtering systems may vary from structure to structure according to a variety of factors including the size of the structure, the nature and umber of fluids being carried in the various structural member systems, the particular uses of facilities located on the lateral structures (ornamental plant growth, crop plant growth, recreation, etc.), the specific nature of the land and uses surrounding a particular structure (an adaptive building located in a mountainous area may have different requirements from one located in a desert).

The examples disclosed herein were made using specific tower/building designs and configurations as shown in the drawings. It is understood by one of ordinary skill in the art that the methods, techniques, and systems disclosed in those examples could be adapted and used in conjunction with buildings having other designs. The adaptive building envelopes could be modified to work in conjunction with new construction of buildings having a more conventional/traditional exterior design as well as adapted for use in retrofitting/remodeling existing structures. It is also understood that the disclosed methods, techniques, and systems could be adapted for use in a variety of locations such as urban or rural and adapted for use in a variety of different biomes such as deserts, coastal areas, prairies, and the like.

While the claimed technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the claimed technology are desired to be protected.

What is claimed is:

1. An adaptive building structure for providing structural support and fluidic transport, comprising:
   an upper portion having a frustoconical shape;
   a lower portion;
   a middle portion operationally connected between the upper portion and the lower portion;
   a first fluidic transport network extending from the lower portion to the upper portion, wherein the first fluidic transport network is hollow to transport a first fluid;
   a second fluidic transport network extending from the lower portion to the upper portion, wherein the second fluidic transport network is hollow to transport a second fluid;
   wherein the first fluid and the second fluid are different fluids;
   wherein the first fluid is rainwater;
   a rainwater collector operationally connected to the first fluidic transport network;
   wherein the first fluidic transport network and the second fluidic transport network are mechanically connected together to provide structural support;
   wherein the first fluidic transport network and the second fluidic transport network are fluidically isolated from one another to inhibit fluidic communication; and
   a first filter plate operationally connected to the first fluidic transport network to filter the first fluid.

2. The adaptive building structure of claim 1, further comprising:
   wherein the first fluidic transport network is operationally connected to a fluidic storage tank disposed therein; and
   at least one pump fluidically connected to the first fluidic transport network capable of pumping the first fluid from the fluidic storage tank to the upper portion.

3. The adaptive building structure of claim 1, wherein the second fluidic transport network is configured to transport one of rainwater, ground water, gray water, surface water, and combinations thereof.

4. The adaptive building structure of claim 1, wherein the second fluidic transport network is configured to transport air from the lower portion to the upper portion of the adaptive building structure.

5. The adaptive building structure of claim 4, wherein the second fluidic transport network is fluidically connected to a second filter plate.

6. The adaptive building structure of claim 1, further comprising:
   at least one generally laterally disposed support structure operationally connected to the first fluidic transport network; and
   wherein the at least one generally laterally disposed support structure includes at least one solar panel.

7. The adaptive building structure of claim 1, further comprising:
   at least one generally laterally disposed support structure operationally connected to the second fluidic transport network; and
   wherein the at least one generally laterally disposed support structure includes at least one growing system selected from a hydroponic growing system, an aeroponic growing system, a vertical growing system, and combinations thereof.

8. The adaptive building structure of claim 7, wherein water is provided to the at least one growing system on the at least one generally laterally disposed support structure from the second fluidic transport network.

9. The adaptive building structure of claim 1, wherein:
   the first fluidic transport network and the second fluidic transport network are mechanically connected together at a junction;
   the junction has a filter plate structure;
   the filter plate structure has a first side positioned along the first fluidic transport network;
   the filter plate structure has a second side positioned along the second fluidic transport network;
   the first side of the filter plate structure houses the first filter plate; and
   the second side of the filter plate structure houses a second filter plate.

10. The adaptive building structure of claim 9, further comprising:
    a hollow structural member system extending into the filter plate structure proximal to the first filter plate and the second filter plate;
    wherein the second filter plate is configured to filter the second fluid; and
    wherein the hollow structural member system is configured to introduce air to aerate the first fluid and the second fluid to promote filtering.

11. The adaptive building structure of claim 1, further comprising:
    a lateral support structure operationally connected to the first fluidic transport network;
    wherein the lateral support structure extends in a general lateral direction;
    wherein the first fluidic transport network includes a first series of first hollow structural members configured to transport the first fluid;
    wherein the first hollow structural members are hollow;
    wherein the second fluidic transport network includes a second series of second hollow structural members configured to transport the second fluid;
    wherein the second hollow structural members are hollow; and
    wherein the first fluidic transport network and the second fluidic transport network are fluidically isolated from one another to inhibit fluidic communication between the first hollow structural members and the second hollow structural members.

12. An adaptive building exoskeleton for providing structural support and fluidic transport, comprising:
    at least one fluidic transport network defining an interconnected upper, generally frustoconical portion, a lower portion, and a middle portion operationally connected to the upper portion and to the lower portion;
    at least one laterally disposed support structure operationally connected to the at least one fluidic transport network;

wherein the at least one fluidic transport network includes a first fluidic transport network and a second fluidic transport network;
a rainwater collector operationally connected to the first fluidic transport network;
wherein the first fluidic transport network and the second fluidic transport network are mechanically connected together at a junction;
wherein the junction has a filter plate structure;
wherein the filter plate structure has a first side positioned along the first fluidic transport network;
wherein the first side of the filter plate structure houses one or more first filter plates;
wherein the first filter plates are configured to filter rainwater from the rainwater collector;
wherein the filter plate structure has a second side positioned along the second fluidic transport network;
wherein the second side of the filter plate structure houses one or more second filter plates; and
wherein the first filter plates and the second filter plates are configured for removal from the filter plate structure to facilitate cleaning.

13. The adaptive building exoskeleton of claim 12, further comprising a turbine operationally connected to the rainwater collector for converting potential energy into electrical energy.

14. The adaptive building exoskeleton of claim 12, further comprising:
wherein the first fluidic transport network is operationally connected to a fluidic storage tank disposed therein; and
at least one pump fluidically connected to the first fluidic transport network capable of pumping the first fluid from the fluidic storage tank to the upper portion.

15. The adaptive building exoskeleton of claim 12, wherein the second fluidic transport network is configured to transport one of rainwater, ground water, gray water, surface water, and combinations thereof.

16. The adaptive building exoskeleton of claim 12, wherein the second fluidic transport network is configured to transport air from the lower portion to the upper portion of the adaptive building exoskeleton.

17. The adaptive building exoskeleton of claim 12, further comprising:
at least one generally laterally disposed support structure operationally connected to the first fluidic transport network; and
wherein the at least one generally laterally disposed support structure includes at least one solar panel.

18. The adaptive building exoskeleton of claim 12, further comprising:
at least one generally laterally disposed support structure operationally connected to the first fluidic transport network; and
wherein the at least one generally laterally disposed support structure includes at least one growing system selected from a hydroponic growing system, an aeroponic growing system, a vertical growing system, and combinations thereof.

19. The adaptive building exoskeleton of claim 18, wherein water is provided to the at least one growing system on the generally laterally disposed support structure from the first fluidic transport network.

20. The adaptive building exoskeleton of claim 12, further comprising:
a hollow structural member system extending into the filter plate structure proximal to the first filter plates and the second filter plates;
wherein the second filter plates are configured to filter groundwater; and
wherein the hollow structural member system is configured to introduce air to aerate the rainwater and the groundwater to promote purification.

* * * * *